US009600295B2

(12) United States Patent
Liu

(10) Patent No.: US 9,600,295 B2
(45) Date of Patent: Mar. 21, 2017

(54) SYSTEMS AND METHODS OF PROVIDING MULTIPLE VIDEO OUTPUTS DURING A PRE-BOOT ENVIRONMENT

(71) Applicant: Wei Liu, Austin, TX (US)

(72) Inventor: Wei Liu, Austin, TX (US)

(73) Assignee: Dell Products LP, Round Rock, TX (US)

(*) Notice: Subject to any disclaimer, the term of this patent is extended or adjusted under 35 U.S.C. 154(b) by 90 days.

(21) Appl. No.: 14/589,601

(22) Filed: Jan. 5, 2015

(65) Prior Publication Data

US 2016/0196147 A1  Jul. 7, 2016

(51) Int. Cl.
| | |
|---|---|
| *G06F 9/00* | (2006.01) |
| *G06F 9/24* | (2006.01) |
| *G06F 15/177* | (2006.01) |
| *G06F 9/44* | (2006.01) |
| G06F 11/32 | (2006.01) |
| G06F 3/041 | (2006.01) |
| G06F 11/22 | (2006.01) |
| G06F 17/30 | (2006.01) |

(52) U.S. Cl.
CPC .......... *G06F 9/4411* (2013.01); *G06F 3/0412* (2013.01); *G06F 11/2284* (2013.01); *G06F 11/328* (2013.01); *G06F 17/30825* (2013.01); *G06T 2207/10016* (2013.01)

(58) Field of Classification Search
CPC .. G06F 3/0412; G06F 11/2284; G06F 11/328; G06F 9/4411; G06F 17/30825; G06T 2207/10016
See application file for complete search history.

(56) References Cited

U.S. PATENT DOCUMENTS

| | | | |
|---|---|---|---|
| 8,982,158 B2* | 3/2015 | Chen | G06F 3/1415 345/649 |
| 2013/0286027 A1* | 10/2013 | Desselle | G09G 5/006 345/520 |
| 2015/0097843 A1* | 4/2015 | Lambert | G06F 9/4401 345/503 |

OTHER PUBLICATIONS

HP UEFI System Utilities and Shell Command Mobile Help for HP ProLiant Gen9 Servers, Printed from Internet Dec. 15, 2014, 1 pgs.
HP, "Microsoft Windows on HP ProLiant WS460C Gen8 Workstation Blade With WS460c Graphics Expansion Blade", Administrator Guide, Sep. 2013, 27 pgs.

* cited by examiner

*Primary Examiner* — Xuxing Chen
(74) *Attorney, Agent, or Firm* — Egan Peterman Enders Huston

(57) ABSTRACT

Systems and methods for providing pre-boot displays at the same time on both a discrete video controller and an embedded video controller of an information handling system in a pre-boot environment, e.g., such that a discrete video controller provides video data for generating a video display during pre-boot operations, while at the same time the embedded video controller also remains active and synchronized with the discrete video controller so that the embedded video controller simultaneously provides video data for generating a video display during pre-boot operations.

20 Claims, 2 Drawing Sheets

SYSTEMS AND METHODS OF PROVIDING MULTIPLE VIDEO OUTPUTS DURING A PRE-BOOT ENVIRONMENT

FIELD OF THE INVENTION

This invention relates generally to information handling systems and, more particularly, to video output for information handling systems in a pre-boot environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as servers and workstation servers often employ an onboard graphics controller embedded on the motherboard that is accessible to an out-of-band remote access controller of the system, such as an integrated Dell Remote Access Controller (iDRAC) available from Dell Products L.P. of Round Rock, Tex. In such a configuration, the remote access controller is configured to snoop the video frame buffer output from the embedded onboard graphics controller and to provide the same video display information to a remote virtual console user as is output by the embedded video controller to the local system display monitor. The system Basic Input Output System (BIOS) running on an x86 processor provides a setup option to allow a user to disable the embedded onboard video card in order to enable a discrete or add-in (PCI-e) graphics card that has been installed in the system. Traditionally, this setup option is active only if there is a discrete graphics card installed in the system which is not accessible to the remote access controller in the same way as the embedded onboard video controller. When the embedded onboard video has been so disabled, it remains disabled at the beginning of system boot and the video option read-only memory (ROM) from the discrete graphics card is the only one being loaded during power-on self test (POST) so that the POST display is only output from the add-in video card to the local display. Video output is never simultaneously provided on both the embedded video controller and the discrete graphics card during pre-booting time (i.e. the time during startup before booting the operating system). This conventional behavior is acceptable for local users who are sitting in front of the local monitor. However, this provides a poor experience for remote users and administrators. Since the embedded onboard video controller is disabled in the POST, a remote administrator working at a virtual console will see nothing on the screen, preventing the remote user from doing any remote trouble-shooting activities or configurations using BIOS setup or Unified Extensible Firmware Interface (UEFI)-based pre-boot software (e.g., such as Dell Lifeycle Controller available from Dell Products L.P. of Round Rock, Tex.).

One type of conventional x86 processor based workstation blade operates to first use the embedded video controller (with no display on the discrete video card) to generate the boot video console as video output from the system, and then to use the discrete video controller (with no display on the embedded video card) to generate the operating system (OS) video console as video output from the system. This type of conventional workstation blade uses the following modes for Remote Console operations: User Mode (default setting), Admin Mode, Server Mode, and Setup Mode. When the current setting is changed from Setup Mode to User Mode in the BIOS setup for such a conventional system, the system video display will prepare to make the switch from the embedded onboard controller to the discrete graphics card. After this mode has been so changed in the BIOS setup, the remote console output is still visible from the embedded controller via an out-of-band management controller through the POST process and up until the operating system (OS) begins to load. During this window of time before OS loading, the discrete graphics card is disabled and there is no display on the discrete graphics card. Once the OS begins to boot up, the video display will then switch to the discrete graphics card before giving control to the OS. Video output is never simultaneously provided on both the embedded video controller and the discrete graphics card during pre-booting time. Rather, only the embedded video controller is used to generate the boot console, and the discrete or add-in video card is used to generate the OS console.

SUMMARY

Disclosed herein are systems and methods for providing pre-boot displays simultaneously on both a discrete video controller such as discrete (e.g., add-in) video card and an embedded video controller of an information handling system (e.g., such as a server) in a pre-boot environment that exists at a time between system start-up (e.g., at system power-on or system re-start) and prior to booting an operating system. In one embodiment, the disclosed systems and methods may be implemented such that a discrete video controller provides video data for generating a video display during pre-boot operations, while at the same time the embedded video controller also remains active and synchronized with the discrete video controller so that the embedded video controller simultaneously provides video data for generating a video display during pre-boot operations. In a further embodiment, the disclosed systems and methods may be implemented such that a discrete video controller remains the primary video controller that provides video data for generating a local video display to a primary local system user display device during pre-boot operations, while the embedded video controller also remains active and synchronized with the discrete video controller so that the embedded video controller may simultaneously provide video data for generating a remote video display to a remote virtual console user display device (and optionally to any alternate or supplemental local display device/s directly connected to the embedded video controller) during pre-boot operations.

In one embodiment, the disclosed systems and methods may be implemented to allow an out-of band processing device (e.g., such as remote access controller or other processing device that is configured to operate separate from and outside a host OS of an information handling system) to snoop or otherwise monitor the video frame buffer output from the embedded onboard controller so as to provide the same video display information to a remote virtual console user as is output by a separate discrete graphics card to the local system display monitor during pre-boot operation. However, the disclosed systems and methods may alternatively be implemented without such an out-of-band processor and/or with information handling systems that do not have this remote virtual console display capability.

Advantageously, the disclosed systems and methods may be implemented in one embodiment to generate the boot console on multiple video controllers (e.g., video display controllers, video display processors, graphics processing units (GPUs), etc.) of an information handling system (i.e., including add-in (discrete) video controller and embedded video controller) to provide a better user experience for both local and remote users of the information handling system. In one exemplary embodiment, this provided capability may provide pre-boot displays on both an add-in video (GPU) card and embedded video controller to allow both a local user and a remote user (e.g., via remote controller virtual console) the ability to view POST video display information and to trouble-shoot POST issues and configure BIOS, remote access controller/out-of-band processor and device settings in setup and/or lifecycle management controllers of the system. For example, multiple Graphics Output Protocol (GOP) instances may be supported in a Human Interface Infrastructure (HII) browser to enable multiple displays to be shown inside BIOS setup and lifecycle management or UEFI-based pre-boot software controllers. Both the local user and remote virtual console user may use these pre-boot interfaces for trouble-shooting and configuration purposes. In one embodiment, the disclosed systems and methods may be advantageously implemented in a high performance computing (HPC) environment for servers having a dense GPU accelerator configuration and that populate discrete (add-in) video cards by default.

In one respect, disclosed herein is a method of operating an information handling system that includes a host processing device coupled to at least one embedded or integral video controller and at least one discrete video controller. The method may include using the host processing device to perform the following steps prior to booting an operating system (OS) on the host processing device: initializing and enabling the embedded or integral video controller to produce pre-boot video data; and initializing and enabling the discrete video controller to produce pre-boot video data, the pre-boot video data produced by the discrete video controller being simultaneously produced with the pre-boot video data produced by the embedded or integral video controller.

In another respect, disclosed herein is an information handling system, including: at least one embedded or integral video controller; at least one discrete video controller; and a host processing device coupled to the embedded or integral video controller and the discrete video controller. The host processing device may be configured to perform the following steps prior to booting an operating system (OS) on the host processing device: initializing and enabling the embedded or integral video controller to produce pre-boot video data; and initializing and enabling the discrete video controller to produce pre-boot video data simultaneously with the pre-boot video data produced by the embedded or integral video controller.

In another respect, disclosed herein is a method of operating an information handling system that includes a host processing device coupled to at least one embedded or integral video controller and at least one discrete video controller and an out-of-band processing device that is coupled to at least the discrete video controller. The method may include using the host processing device to execute a BIOS setup utility or a provisioning or deployment script prior to booting an OS on the host processing device to allow a user to enter an embedded or integral video controller disable command. The method may then performing the following steps if a currently effective embedded or integral video controller disable command exists: initializing and enabling the embedded or integral video controller to produce pre-boot video data; initializing and enabling the discrete video controller to produce pre-boot video data to generate a local video display on a local user display device coupled to the discrete video controller, the pre-boot video data produced by the discrete video controller being simultaneously produced with the pre-boot video data produced by the embedded or integral video controller; and using the out-of-band processing device to monitor the pre-boot video data produced by the embedded or integral video controller, and to produce the monitored embedded or integral controller pre-boot video data to generate a remote video display on a remote user display device that is remotely coupled to the information handling system, the remote video display being generated simultaneously with the local video display. Alternatively, the method may then performing the following steps if a currently effective embedded or integral video controller disable command does not exist: initializing and enabling only the embedded or integral video controller to produce pre-boot video data.

DESCRIPTION OF ILLUSTRATIVE EMBODIMENTS

Figure 1:
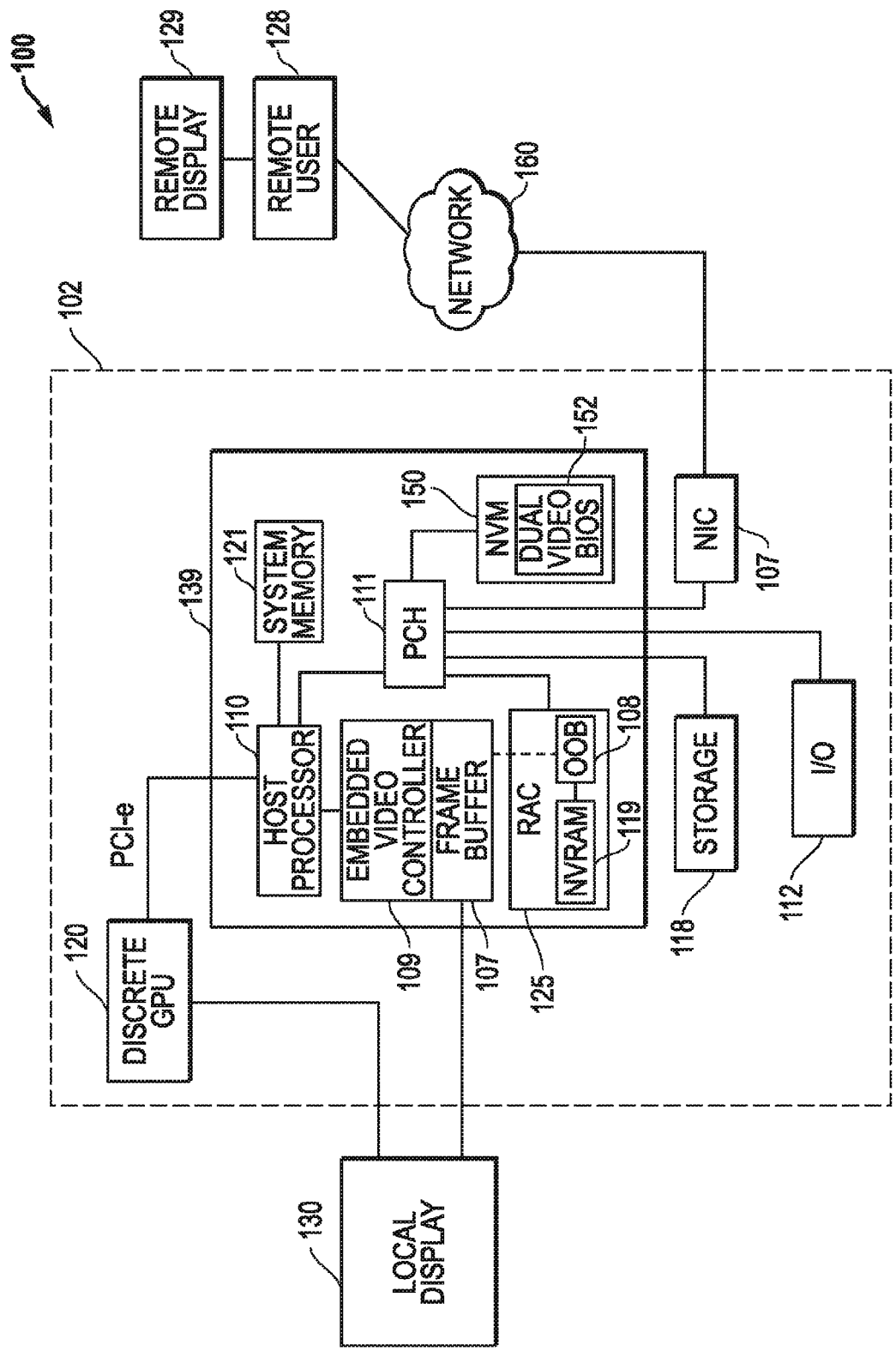
FIG. 1 illustrates a simplified block diagram of an information handling system configured according to one exemplary embodiment of the disclosed systems and methods.

FIG. 1 illustrates an information handling system 100 (e.g., general-purpose computing on graphics processing unit (GPGPU) server, workstation, desktop PC, etc.) configured according to one exemplary embodiment of the disclosed systems and methods. As shown in FIG. 1, information handling system 100 of this exemplary embodiment includes various components that are embedded on a system motherboard 139, it being understood that any one or more of such embedded components may be alternatively provided separate from motherboard 139 within chassis case 102 of information handling system 100, e.g., such as provided on a daughter card or other separate mounting configuration. As shown, information handling system 100 may include one or more host processing devices 110 (e.g., CPU such as x86 based Intel or AMD processor such as Intel Haswell processor, an Advanced Micro Devices (AMD) Kaveri processor, or one of many other suitable processing devices currently available). In this embodiment, host processing device 110 may be configured to execute a host operating system (OS) for system 100. Embedded main system memory 121 (e.g., volatile random access memory such as DRAM or other suitable form of random access memory) may be coupled (e.g., via DDR channel) to an integrated memory controller of CPU 110 to facilitate memory functions, although it will be understood that a memory controller may be alternatively provided as a separate chip or other circuit in other embodiments.

Still referring to the exemplary embodiment of FIG. 1, an embedded graphics or video controller 109 (e.g., embedded GPU) may be provided on motherboard 139 and coupled to exchange data with host processing device 110. Embedded video controller 109 also includes frame buffer memory (e.g., RAM) 107 that stores video frame data for driving from embedded video controller 109 to an external local display (e.g., attached LED monitor) 130 as shown. Also shown coupled to exchange data with host processing device 110 (e.g., across PCI-e bus or other suitable data communication bus) in FIG. 1 is discrete (i.e., non-embedded and non-integrated) video controller (e.g., GPU) 120 that may be, for example, an add-in video card that may also be coupled to provide output video data for generating a video display to local display 130 as shown. It will be understood that in another embodiment, tasks of embedded video controller 109 may be alternatively implemented by an integral video controller provided inside host processing device 100 and coupled to local display 130.

As further illustrated in FIG. 1, host processing device 110 may be coupled to embedded platform controller hub (PCH) 111 which may be present to facilitate input/output functions for the host processing device 110 with various internal components of information handling system 100. In this exemplary embodiment, PCH 111 is shown coupled to other embedded components on motherboard 139 that include embedded nonvolatile memory (NVM) 150 such as Flash, EEPROM or other suitable non-volatile memory. NVM 150 may store, for example, system BIOS for retrieval and execution by host processing device 110 during the practice of the disclosed systems and methods. Shown coupled to PCH 111 is embedded remote access controller 125 (e.g., integrated Dell Remote Access Controller (iDRAC) available from Dell Products L.P. of Round Rock, Tex.) that includes at least one out-of-band processor 108 and associated embedded non-volatile RAM (NVRAM) memory 119. Also coupled to PCH 111 may be various non-embedded components, e.g., such as system storage (e.g., hard disk/s, solid state drive/s, etc.) 118, local input/output (I/O) hardware 112 (e.g., controllers or other circuitry configured to couple to mouse, keyboard, speakers, printer, scanner, etc.).

Still referring to FIG. 1, components of information handling system 100 are remotely coupled to at least one remote user 128 across network 160 (e.g., Internet, corporate intranet, local area network, etc.). In this regard, a network interface card (NIC)/network adapter 107 may be coupled to PCH 111 to allow various components of system 100 to remotely communicate across network 160 with remote user device 128 that is coupled to a remote virtual console display device 129 (e.g., LED monitor) as shown. In one embodiment, out-of-band processing device 108 may be configured to "snoop" or otherwise monitor through PCH 111 the output data of video frame buffer 107 to local display 130 from embedded controller 108 (as functionally illustrated by dashed line in FIG. 1), and to provide this same monitored video display output data to remote virtual console display 129 via remote user information handling system 128 and network 160. In an alternate embodiment, remote access controller 125 may be provided with its own dedicated network controller separate from NIC 107.

It will be understood that the embodiment of FIG. 1 is exemplary only, and that an information handling system may be provided with one or more processing devices that may perform the functions of host processing device 110, remote access controller 125, embedded video controller 109, discrete video controller 120, and other optional processing devices. Examples of such processing devices include, but are not limited to, central processing units (CPUs), embedded controllers, microcontrollers, application specific integrated circuits (ASICs), field programmable gate arrays (FPGAs), etc.

Figure 2:
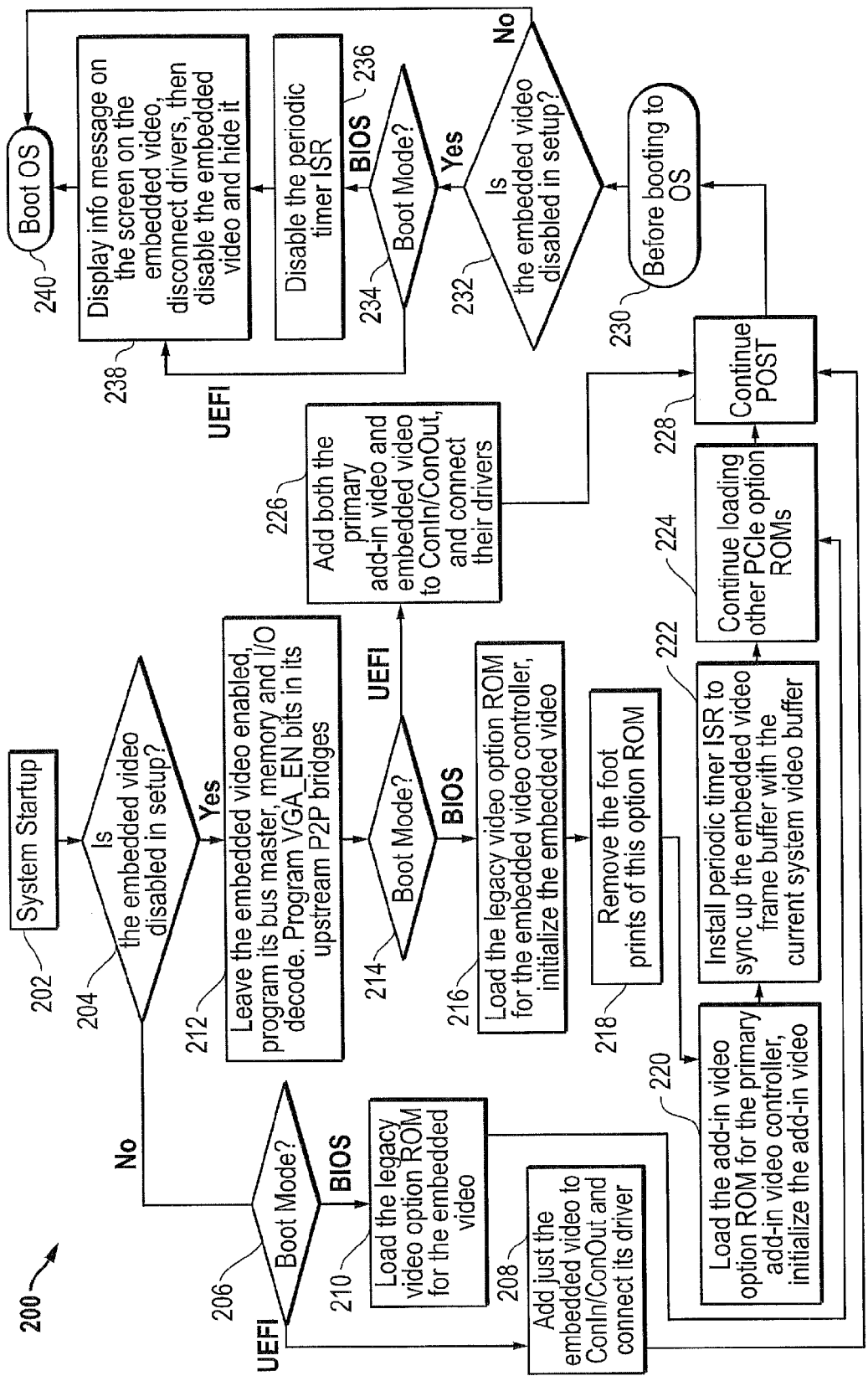
FIG. 2 illustrates system startup methodology according to one exemplary embodiment of the disclosed systems and methods.

FIG. 2 illustrates one exemplary embodiment of system startup methodology 200 that may be implemented at least in part or all by system BIOS executing on host processing device 110 of information handling system 100 to provide pre-boot displays simultaneously on both a discrete (add-in) video card or controller 120 and an embedded video controller 109 (or alternatively an integral video controller of host processing device 110) of an information handling system in a pre-boot environment. Although FIG. 2 is described with reference to the exemplary components of the information handling system embodiment of FIG. 1, it will be understood that methodology 200 may be implemented with any other configuration of an information handling system that includes at least one discrete video controller (e.g., such as add-in video card) together with at least one embedded video controller, and that is configured to be coupled to communicate with one or more remote user device/s to provide video to a remote virtual console display.

As shown, system startup methodology 200 begins at system startup (e.g., at system power-on or system re-start) in step 202. During a first POST, a user may in one embodiment be allowed to run a system BIOS setup utility that allows the user to input a disable command requesting that the embedded video controller 109 be disabled in favor of at least one discrete video controller 120. For example, to run such a system setup BIOS setup utility, a user may press a hot key (e.g., such as F2 or other keystroke/s) during first POST operation. In such a case, after changing the settings in the Setup utility, the system will save the settings and reboot. After such a reboot, methodology 200 continues restart and performs a second and subsequent POST operation. As described below, at this time if the embedded video controller 109 has been previously disabled during a previous POST system setup, then methodology 200 proceeds at step 204 and beyond such that the pre-boot display is visible on both embedded video controller 109 and discrete video controller 120. However, if the embedded video controller 109 is found enabled at step 204, then the display is only visible on the embedded video.

Methodology 200 proceeds from step 202 to step 204 where it is determined whether an embedded video controller disable command is currently in effect, e.g., an embedded video controller disable command has been previously input during the BIOS setup utility (or via provisioning or deployment scripts) by a user and remains effective. If no embedded video controller disable command is currently in effect (e.g., no embedded video controller disable command entered during the most recent execution of BIOS setup utility), then embedded video controller 109 is left enabled and methodology 200 proceeds to step 206 where the current system boot mode is determined (i.e., legacy BIOS mode or Unified Extensible Firmware Interface (UEFI) boot mode).

In the case of legacy BIOS mode, the legacy video option ROM firmware is called and loaded in step 210 and methodology 200 then proceeds to step 224 where other PCI-e option ROM firmware is loaded before continuing with POST in step 228. Alternatively, in the case of UEFI boot mode, methodology 200 proceeds to step 208 where only the embedded video controller 209 is added to the UEFI ConIn/ConOut pointers and a connection is made to its driver in step 208 before continuing POST in step 228.

Thus, during POST step 228 following either of steps 208 and 210, the discrete video controller 120 is not enabled, and embedded video controller 109 is enabled and is the only video controller that provides video data for generating a local video display including video display information (e.g., characters, text, etc.) on a primary local user system display device 130 during pre-boot operations and also simultaneously provides video data for generating a remote video display on remote virtual console displace device 129, and optionally to any alternate or supplemental local display devices 130 that are directly connected to the embedded video controller.

However, if it is determined in step 204 that an embedded video controller 109 disable command is currently in effect (e.g., user disable command has been entered during the preceding BIOS setup utility), then a prerequisite condition for step 212 exists and methodology 200 proceeds to step 212 where system BIOS provides an early video graphics driver that directly programs the video chip and frame buffers of the discrete video controller 120 for better fast video experience. Where multiple discrete video controllers (e.g., multiple add-in graphics or video cards) 120 are present, the system BIOS may also pick a primary discrete video controller. This may be done, for example, either through a user-configurable BIOS setup, or for the sake of simplicity, the system BIOS may pick the discrete video controller that is first enumerated during the PCI bus scan. It is also possible in another embodiment that the system BIOS may choose to pick more than one primary discrete video controllers, e.g., when operating in a UEFI boot mode.

Next, in the case where system BIOS determines in step 204 that that the embedded video controller 109 has been disabled in favor of an discrete video controller/s 120 by a user command during the BIOS setup utility methodology 200 proceeds to step 212 where the embedded video controller is left enabled by the system BIOS at the beginning of system boot despite the embedded video controller disable command provided by the user during execution of the BIOS setup utility, e.g., system BIOS executing on host processing device 110 still programs the embedded video bus master, memory and I/O enable bits, and VGA_EN bits from its corresponding PCI-to-PCI (P2P) bridges.

Methodology 200 proceeds to step 214 where the current system boot mode is determined (i.e., legacy BIOS mode or Unified Extensible Firmware Interface (UEFI) boot mode). In the case the determined current boot mode is a legacy BIOS mode, the legacy video option ROM firmware is called and loaded (e.g., from non-volatile memory of the embedded video controller 109, system NVM 150, BIOS flash chip, etc.) in step 216 to initialize video from the embedded video controller 109. In one UEFI implementation embodiment, the system BIOS may load different legacy PCI option ROMs during native UEFI Compatibility Support Module (CSM) phase to provide legacy BIOS support for booting legacy OS. Conventionally, the system BIOS usually loads the discrete video controller's BIOS interrupt INT10h video option ROM first before any other option ROMs in order to provide pre-boot display of characters in the BIOS environment. However, in methodology 200 of the disclosed systems and methods the video option ROM may be loaded from the embedded video controller 109 first, e.g., the legacy embedded video controller may be first loaded into shadow memory (e.g., mapped to the system memory space 121) in step 216 to put the embedded video controller 109 into text mode. Running the embedded video option ROM first ensures proper initialization of the embedded video fonts and any coupled or connected video display/s (e.g., remote virtual console display 129, and optionally any local display 130 that is directly connected to the embedded video controller 109).

After embedded video initialization in step 216, all of the "footprint" of the legacy embedded video controller option ROM is removed by system BIOS in step 218, including the runtime image in shadow space (starting from 0cX0000 memory address) mapped to the system memory space 121. The system BIOS also is configured to unprogram the VGA_EN bits in the parent P2P bridges of the embedded video controller 109 at this time, e.g., since only one intended video controller path may have VGA_EN bits set at a given time. Thus, in step 218 the embedded video controller option ROM may be cleared out (with interrupts and BIOS settings) as if it had never been loaded.

Still referring to FIG. 2, methodology 200 then proceeds to step 220 where system BIOS next calls and loads the add-in or discrete video option ROM (e.g., BIOS interrupt INT10h from non-volatile memory of the primary discrete video controller 120, system NVM 150, BIOS flash chip, etc.) to initialize the video display on the primary discrete video controller 120 to provide video data for generating a video display (e.g., characters, text, etc.) on a local user display 130. At this time, system BIOS installs periodic timer interrupt (e.g., BIOS interrupt INT1Ch) with an interrupt service routine (ISR) in step 222 to sync up the frame buffer of the embedded video controller 109 with the current system video buffer. This step effectively syncs up the embedded video display with the primary discrete (e.g., add-in) video. It will be understood that in one embodiment there may be more intelligence built into the ISR, such as updating the cursor position, etc. In yet another embodiment, the periodic interrupt may be a periodic system management interrupt (SMI). Methodology 200 then proceeds to step 224 where other PCI-e option ROM firmware is loaded before continuing with POST in step 228.

Referring again to step 214, if the current system boot mode is determined to be UEFI boot mode in step 214 instead of legacy BIOS mode, then methodology 200 proceeds instead to step 226 where during console initialization phase system BIOS adds both the discrete video UEFI device path for the controller of primary discrete video controller 120 and the UEFI device path for the embedded video controller 109 to the UEFI Console In/Console Out (ConIn/ConOut) pointers so that both primary discrete video controller 120 and embedded video controller 109 are in ConOut, and connects to both their drivers before continuing POST in step 228. In one optional embodiment, during a UEFI boot mode system BIOS may add the UEFI device paths in step 228 for more than one discrete video controllers 120.

Thus, during POST step 228 following either of steps 224 or 226, the discrete video controller 120 is the primary video controller that provides video data for generating a local video display on a primary local user system display device 130 during pre-boot operations while embedded video controller 109 also remains active and synchronized with the discrete video controller 120 so that the embedded video controller 109 simultaneously provides video data for generating a remote video display on remote virtual console displace device 129, e.g., and optionally to any alternate or supplemental local display devices 130 that are directly connected to the embedded video controller. In one embodiment, the local video display generated on the primary local user system display device 130 may include or display the same video display information (e.g., characters, text, etc.) as the remote video display generated on the remote virtual console displace device 129.

In all cases after step 228 in POST, methodology 200 proceeds to step 230 to a point just before booting the operating system, and system BIOS proceeds at this time according to step 232. In particular, if the embedded video controller was not disabled by a user during previous BIOS setup utility, then methodology 200 proceeds directly to step 240 and boots the operating system with OS console generated by the embedded controller. However, if the embedded video controller 109 was disabled by a user during previous BIOS setup utility, then the system BIOS is configured to turn off and hide the embedded video controller 109 as follows. Methodology 200 proceeds to step 234 where it proceeds according to the current boot mode, e.g., such as at the point of READY_TO_BOOT, BIOS interrupt INT19h, or EFI_EXIT_BOOT_SERVICES. In the case of legacy BIOS boot mode, methodology 200 proceeds from step 234 to step 236 where system BIOS disables the periodic timer ISR that was previously installed in step 222, and then proceeds to step 238 where an informational message may be left on the embedded video display to indicate the embedded video controller 109 is disabled per Setup settings. Also in step 238, system BIOS may disconnect the drivers for embedded video controller 109, and then disable the embedded video controller 109, before proceeding to give control to OS loader in step 240 to boot the OS. On the other hand, when the current boot is UEFI boot mode, methodology 200 proceeds from step 234 directly to step 238 and then to step 240 which are performed as described above. At the conclusion of step 238, only the discrete video controller 120 remains enabled before starting boot of the OS in step 240. The optional informational message described above in step 238 may be left on the embedded video display after step 238 indicating this display is terminated because the embedded video is disabled per the settings made during BIOS setup.

It will be understood that the embodiment of methodology 200 of FIG. 2 is exemplary only, and that any other combination of fewer, additional and/or alternative steps (and different orders of the same) may be employed that are suitable to implement a system startup methodology in which pre-boot displays are simultaneously provided on both a discrete (add-in) video card and an embedded video controller of an information handling system in a pre-boot environment.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will also be understood that one or more of the tasks, functions, or methodologies described herein (e.g., including those described for system BIOS, host processing device 110, remote access controller 125, embedded video controller 109, and/or discrete video controller 120) may be implemented by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of operating an information handling system that includes a host processing device coupled to at least one embedded or integral video controller and at least one discrete video controller, the method comprising using the host processing device to perform the following steps prior to booting an operating system (OS) on the host processing device:

initializing and enabling the embedded or integral video controller to produce pre-boot video data; and initializing and enabling the discrete video controller to produce pre-boot video data, the pre-boot video data produced by the discrete video controller being simultaneously produced with the pre-boot video data produced by the embedded or integral video controller.

2. The method of claim 1, where the information handling system further includes an out-of-band processing device that is coupled to at least the embedded or integral video controller; and where the method further comprises performing the following steps prior to booting the OS on the host processing device:
  initializing and enabling the discrete video controller to produce pre-boot video data to generate a local video display on a local user display device coupled to the discrete video controller, the pre-boot video data produced by the discrete video controller being simultaneously produced with the pre-boot video data produced by the embedded or integral video controller; and
  using the out-of-band processing device to monitor the pre-boot video data produced by the embedded or integral video controller, and to produce the monitored embedded or integral controller-produced pre-boot video data to generate a remote video display on a remote user display device that is remotely coupled to the information handling system, the remote video display being generated simultaneously with the local video display.

3. The method of claim 2, where the local video display generated on the local user display device includes the same video display information as the remote video display simultaneously generated on the remote user display device.

4. The method of claim 2, further comprising using the host processing device to execute at least a portion of a power-on-self-test (POST) prior to booting an OS on the host processing device, and after the steps of initializing and enabling the embedded or integral video controller to produce pre-boot video data and initializing and enabling the discrete video controller to produce pre-boot video data; and where the local video display generated on the local user display device and simultaneously generated on the remote user display device each includes POST display information generated during the POST.

5. The method of claim 1, further comprising performing the following steps after producing the pre-boot video data from the discrete video controller simultaneously with the pre-boot video data produced by the embedded or integral video controller:
  disabling the embedded or integral video controller; and only then booting an OS on the host processing device.

6. The method of claim 1, further comprising using the host processing device to execute a system BIOS to perform the steps of initializing and enabling the embedded or integral video controller to produce pre-boot video data, and initializing and enabling the discrete video controller to produce pre-boot video data.

7. The method of claim 1, further comprising:
  using the host processing device to execute a BIOS setup utility or a provisioning or deployment script to allow a user to enter an embedded or integral video controller disable command;
  then determining whether an embedded or integral video controller disable command has been previously entered by a user and is currently effective; and then:
    performing the steps of initializing and enabling the embedded or integral video controller and initializing and enabling the discrete video controller when it is determined that an embedded or integral video controller disable command is currently effective; and
    only initializing and enabling the embedded or integral video controller when it is determined that no embedded or integral video controller disable command is currently effective.

8. The method of claim 1, further comprising:
  using the host processing device to execute a system BIOS to determine whether a current boot mode is a legacy BIOS mode or a Unified Extensible Firmware Interface (UEFI) boot mode prior to the initializing the embedded or integral video controller; and
  then performing the following steps to initialize each of the embedded or integral video controller and the discrete video controller to produce pre-boot video data if the current boot mode is determined to be a legacy boot mode:
    initializing the embedded or integral video controller to produce pre-boot video data by loading legacy video option ROM firmware for the embedded or integral video controller to initialize video from the embedded or integral video controller,
    then unloading the legacy video option ROM for the embedded or integral video controller, and
    initializing the discrete video controller to produce pre-boot video data by loading the legacy video option ROM for the discrete video controller and synchronizing the video display on the embedded or integral video controller with the video display on the discrete video controller; or
  then performing the following steps if the current boot mode is determined to be a UEFI boot mode:
    adding both a UEFI device path for the discrete video controller and a UEFI device path for the embedded or integral video controller during a console initialization step to the UEFI Console In/Console Out (ConIn/ConOut), and
    connecting to a driver of the discrete video controller to initialize the discrete video controller to produce pre-boot video data and connecting to a driver of the embedded or integral video controller to initialize the embedded or integral video controller to produce pre-boot video data.

9. The method of claim 8, further comprising using the host processing device to execute at least a portion of a power-on-self-test (POST) after initializing each of the embedded or integral video controller and the discrete video controller to produce pre-boot video data and prior to booting an OS.

10. The method of claim 9, further comprising performing the following steps after using the host processing device to execute the POST:
  disabling the embedded or integral video controller; and only then booting the OS on the host processing device.

11. An information handling system, comprising:
  at least one embedded or integral video controller;
  at least one discrete video controller; and
  a host processing device coupled to the embedded or integral video controller and the discrete video controller;
  where the host processing device is configured to perform the following steps prior to booting an operating system (OS) on the host processing device:
    initializing and enabling the embedded or integral video controller to produce pre-boot video data; and
    initializing and enabling the discrete video controller to produce pre-boot video data simultaneously with the pre-boot video data produced by the embedded or integral video controller.

12. The system of claim 11, further comprising:
an out-of-band processing device that is coupled to the embedded or integral video controller;
where the at least one discrete video controller is configured to be coupled to at least one local display device;
where the host processing device is further configured to perform the following step prior to booting the OS on the host processing device:
   initializing and enabling the discrete video controller to produce pre-boot video data to generate a local video display on a local user display device coupled to the discrete video controller such that the pre-boot video data produced by the discrete video controller is simultaneously produced with the pre-boot video data produced by the embedded or integral video controller; and
where the at least one discrete video controller is configured to be coupled to at least one local display device; and
where the out-of-band processing device is further configured to monitor the pre-boot video data produced by the embedded or integral video controller, and to produce the monitored embedded or integral controller pre-boot video data to generate a remote video display on a remote user display device that is remotely coupled to the information handling system, the remote video display being generated simultaneously with the local video display prior to booting the OS on the host processing device.

13. The system of claim 12, where the host processing device is configured to execute at least a portion of a power-on-self-test (POST) prior to booting the OS on the host processing device, and after the steps of initializing and enabling the embedded or integral video controller to produce pre-boot video data and initializing and enabling the discrete video controller to produce pre-boot video data; and where the local video display generated on the local user display device and simultaneously generated on the remote user display device each includes POST display information generated during the POST.

14. The system of claim 11, where the host processing device is further configured to perform the following steps after the pre-boot video data is produced from the discrete video controller simultaneously with the pre-boot video data produced by the embedded or integral video controller:
   disabling the embedded or integral video controller; and
   only then booting the OS on the host processing device.

15. The system of claim 11, where the host processing device is further configured to execute a system BIOS to initialize and enable the embedded or integral video controller to produce pre-boot video data, and to initialize and enable the discrete video controller to produce pre-boot video data.

16. The system of claim 11, where the host processing device is further configured to:
   execute a BIOS setup utility or a provisioning or deployment script to allow a user to enter an embedded or integral video controller disable command; and then
      perform the steps of initializing and enabling the embedded or integral video controller and initializing and enabling the discrete video controller when it is determined that an embedded or integral video controller disable command is currently effective, and
      only initialize and enable the embedded or integral video controller when it is determined that no embedded or integral video controller disable command is currently effective.

17. The system of claim 11, where the host processing device is configured to execute a system BIOS to determine whether a current boot mode is a legacy BIOS mode or a Unified Extensible Firmware Interface (UEFI) boot mode prior to the initializing the embedded or integral video controller; and then either one of:
   perform the following steps to initialize each of the embedded or integral video controller and the discrete video controller to produce pre-boot video data if the current boot mode is determined to be a legacy boot mode:
      initializing the embedded or integral video controller to produce pre-boot video data by loading legacy video option ROM firmware for the embedded or integral video controller to initialize video from the embedded or integral video controller,
      then unloading the legacy video option ROM for the embedded or integral video controller, and
      initializing the discrete video controller to produce pre-boot video data by loading the legacy video option ROM for the discrete video controller and synchronizing the video display on the embedded or integral video controller with the video display on the discrete video controller; or
   perform the following steps if the current boot mode is determined to be a UEFI boot mode:
      adding both a UEFI device path for the discrete video controller and a UEFI device path for the embedded or integral video controller during a console initialization step to the UEFI Console In/Console Out (ConIn/ConOut), and
      connecting to a driver of the discrete video controller to initialize the discrete video controller to produce pre-boot video data and connect to a driver of the embedded or integral video controller to initialize the embedded or integral video controller to produce pre-boot video data.

18. The system of claim 17, where the host processing device is further configured to execute at least a portion of a power-on-self-test (POST) after initializing each of the embedded or integral video controller and the discrete video controller to produce pre-boot video data and prior to booting an OS.

19. The system of claim 18, where the host processing device is further configured to perform the following steps after using the host processing device to execute the POST:
   disabling the embedded or integral video controller; and
   only then booting the OS on the host processing device.

20. A method of operating an information handling system that includes a host processing device coupled to at least one embedded or integral video controller and at least one discrete video controller and an out-of-band processing device that is coupled to at least the embedded or integral video controller, the method comprising performing the following steps prior to booting an OS on the host processing device:
   using the host processing device to execute a BIOS setup utility or a provisioning or deployment script to allow a user to enter an embedded or integral video controller disable command; and
   then performing the following steps if a currently effective embedded or integral video controller disable command exists:

initializing and enabling the embedded or integral video controller to produce pre-boot video data, initializing and enabling the discrete video controller to produce pre-boot video data to generate a local video display on a local user display device coupled to the discrete video controller, the pre-boot video data produced by the discrete video controller being simultaneously produced with the pre-boot video data produced by the embedded or integral video controller, and using the out-of-band processing device to monitor the pre-boot video data produced by the embedded or integral video controller, and to produce the monitored embedded or integral controller pre-boot video data to generate a remote video display on a remote user display device that is remotely coupled to the information handling system, the remote video display being generated simultaneously with the local video display; or then performing the following steps if a currently effective embedded or integral video controller disable command does not exist:

initializing and enabling only the embedded or integral video controller to produce pre-boot video data.

* * * * *